Patented Feb. 12, 1946

2,394,583

UNITED STATES PATENT OFFICE 2,394,583

THIOCYANO ALIPHATIC ACID ESTERS OF ENDOETHYLENE - HYDROXYCYCLOPEN - TANOINDANE

Herman A. Bruson, Philadelphia, Pa., assignor to The Resinous Products & Chemical Company, Philadelphia, Pa., a corporation of Delaware No Drawing. Application September 12, 1944, Serial No. 553,799

5 Claims. (Cl. 260—454)

This invention relates to esters of thiocyano aliphatic carboxylic acids and 3,5-endoethylene hydroxycyclopentanoindane. These esters are new compounds having the formula $$C_{14}H_{15}\text{—OCO—A—SCN}$$

wherein A is an alkylene group and $C_{14}H_{15}$ is the endoethylene cyclopentanoindane group as herein defined.

This application is a continuation-in-part of copending application Serial No. 531,763, filed April 19, 1944, and reference is made thereto as to details of the method of preparation of the new thiocyano esters which are specifically claimed in the present specification.

The new compounds are advantageously prepared by reacting a halogenated aliphatic carboxylic acid preferably in the presence of an acidic condensing agent, with 1,4-endomethylene tetrahydro-$\Delta^2$-fluorene to form an ester of endoethylene hydroxycyclopentanoindane by an addition-rearrangement reaction and replacing the halogen atom with a thiocyano radical. Alternatively, the new compounds of this invention are prepared by esterifying the new compound, 3,5 - endoethylene hydroxycyclopentano -4,5- indane, with a halo aliphatic carboxylic acid and replacing the halogen with a thiocyano radical.

Thus, in accordance with the first method mentioned above, 1,4-endomethylene tetrahydro-$\Delta^2$-fluorene reacts with a halo aliphatic carboxylic acid, XACOOH, where X represents bromine or chlorine, as follows:

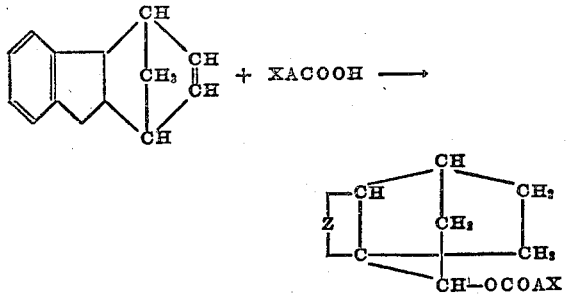

wherein Z is the benzylene group attached to the 4 and 5 carbon atoms of the endoethylene cyclopentano group. The halogen atom may now be replaced with a thiocyano radical by metathesis with a metal salt of thiocyanic acid, such as sodium thiocyanate, potassium thiocyanate, ammonium thiocyanate, lead thiocyanate, silver thiocyanate, calcium thiocyanate, or the like, preferably in a solvent medium such as methyl alcohol, ethyl alcohol, propyl or isopropyl alcohol, acetone, or similar volatile organic solvents. The halogen salt which forms is readily separated and the solution of thiocyano ester purified by conventional methods, such as decolorizing with charcoal, solvent extraction, or distillation.

As an acidic condensing agent in the above reaction between 1,4-endomethylene tetrahydro-$\Delta^2$-fluorene and a halo aliphatic carboxylic acid there may e ubsed boron trifluoride and its coordination complexes with oxygenated compounds such as ethers, esters, carboxylic acids, ketones, aldehydes, water, etc., sulfuric acid, acid esters of sulfuric acid, such as ethyl acid sulfate, sulfonic acids, such as toluene sulfonic acid, or butyl sulfonic acid, other strong acids, and the usual amphoteric metal halides with are effective as acidic catalysts such as aluminum chloride. The amount of such catalyst used need be only a small per cent of the weight of the starting hydrocarbon but may be as much as or more than a molar equivalent.

The reaction may be performed with or without an organic solvent such as ethylene dichloride or dioxane. It may be performed at a temperature from room temperature up to 150° C. or more, although the range of about 50° C. to about 140° C. is preferred.

According to the second method, 1,4-endomethylene tetrahydro-$\Delta^2$-fluorene is hydrated in the presence of a strongly acidic catalyst, such as sulfuric acid, addition and rearrangement also occurring in this reaction. The reaction, full details of which are given in application Serial No. 517,204, filed January 6, 1944, may be represented as follows:

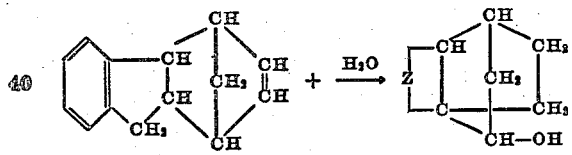

This alcohol is then esterified with a halo aliphatic carboxylic acid by conventional methods and the resulting ester treated with a metal thiocyanate as described above.

As suitable halo aliphatic acids there may be used bromoacetic acid, chloroacetic acid, $\beta$-bromopropionic acid, $\alpha$-chloro-propionic acid, $\alpha$-chlorobutyric acid, $\alpha$-bromobutyric acid, $\beta$-chlorobutyric acid, $\beta$-bromobutyric acid, $\alpha$-bromoisobutyric acid, $\alpha$-chloro-isobutyric acid, and other chloro- and bromo-substituted fatty acids, particularly those of two to eight carbon atoms, although halogen-substituted higher fatty acids may also be used.

The thiocyano esters of this invention are useful as solvents and softeners, particularly for resinous materials and as toxicants in insecticidal compositions. They are also useful as additives in lubricating compositions.

The following examples describe the preparation of typical thiocyano esters of this invention and present typical properties thereof:

Example 1

A mixture of 290 grams of chloroacetic acid, 550 grams of 1,4-endomethylene tetrahydro-$\Delta^2$-fluorene, and 20 grams of 40% sulfuric acid was stirred and heated at 95° C. for six hours. The reaction mixture was cooled, washed with water, dried, and distilled in vacuo. The chloroacetate of endoethylene hydroxy-cyclopentanoindane distilled over at 165–170° C./1 mm. as a colorless oil.

A mixture of 195 grams of the above ester, 65 grams of sodium thiocyanate and 200 grams of ethanol was stirred and boiled under reflux for eight hours. The resulting mixture was cooled and washed thoroughly with water. The product thus obtained was dried in vacuo at 95° C., yielding an amber-colored oil, weighing 203 grams and consisting of over 98% pure thiocyanoacetate of endoethylene hydroxycyclopentanoindane. A 5% solution of this compound in deodorized kerosene gave a 100% kill when tested by the Peet-Grady method as an insecticide against flies, and was free of objectionable odor or irritation.

Example 2

A mixture of 75 grams of 1,4-endomethylene tetrahydro-$\Delta^2$-fluorene and 100 grams of aqueous 40% sulfuric acid was rapidly stirred and boiled under reflux at 120-125° C. for four and one-half hours. The mixture was cooled and the resulting dark, viscous oil separated, and taken up in benzene. The benzene solution was washed thoroughly with water and dilute sodium hydroxide solution. The benzene was then stripped off and the residual oil distilled in vacuo.

The endoethylene hydroxycyclopentanoindane thus prepared distilled over at 165–175° C./5 mm. as a viscous pale yellow oil which crystallizes on standing. After recrystallization from nitromethane it formed colorless crystals melting at 107–108° C.

One molecular equivalent of the above alcohol and 1.1 mols of beta-chloropropionic acid together with 1 gram of 40% sulfuric acid was boiled in benzene solution under a reflux condenser attached to a water separator until water ceased coming over. This required about three hours. The product was cooled, washed with water, and dried in vacuo to yield the β-chloropropionate of endoethylene hydroxycyclopentanoindane as a pale amber-colored oil.

One mol of this ester in an equal volume of alcohol was boiled for eight hours with 1.1 mol equivalents of potassium thiocyanate. The product was then washed with water and dried in vacuo to yield the β-thiocyanopropionic acid ester of endoethylene hydroxycyclopentanoindane as a thick amber-colored oil.

It has powerful insecticidal action against flies, mosquitoes and other pests and is free from objectionable odor or irritation to the user.

Example 3

Instead of the β-chloropropionic acid in Example 2, an equivalent molecular quantity of α-chloroisobutyric acid may be used. The α-chloroisobutyrate of endoethylene hydroxycyclopentanoindane is obtained as a pale yellow oil. When heated in isopropanol solution with an equivalent amount of sodium thiocyanate it yields the corresponding α-thiocyanoisobutyrate of endoethylene hydroxy-cyclopentanoindane as a pale yellow oil, useful as a toxicant for the preparation of insecticides.

The phenyl group which is present in the molecule of the addition-rearrangement product permits the introduction of a great variety of substituents in that part of the molecule. One or more such substituents may be introduced into the phenyl ring. Typical groups which may be introduced include alkyl groups, such as methyl, ethyl, isopropyl, butyl, tert.-butyl, octyl, isooctyl, $\alpha,\alpha,\gamma,\gamma$-tetramethyl butyl, nonyl, etc., keto, such as the acetyl group, nitro, sulfonate, halogen, etc.

I claim:

1. As a new compound, an ester of a thiocyano saturated aliphatic carboxylic acid and 3,5-endoethylene hydroxycyclopentanoindane.

2. As a new compound, an ester of a saturated thiocyano aliphatic carboxylic acid of two to eight carbon atoms and 3,5-endoethylene hydroxycyclopentanoindane.

3. As a new compound, the thiocyanoacetate of 3,5-endoethylene hydroxycyclopentanoindane.

4. As a new compound, the β-thiocyanopropionate of 3,5-endoethylene hydroxycyclopentanoindane.

5. As a new compound, the α-thiocyanoisobutyrate of 3,5-endoethylene hydroxycyclopentanoindane.

HERMAN A. BRUSON.